(12) United States Patent
Zhang et al.

(10) Patent No.: US 11,405,086 B2
(45) Date of Patent: Aug. 2, 2022

(54) CHANNEL STATE INFORMATION (CSI) ACQUISITION FOR DYNAMIC MIMO TRANSMISSION

(71) Applicants: Yu Zhang, Beijing (CN); Wanshi Chen, San Diego, CA (US); Chao Wei, Beijing (CN); Hao Xu, Beijing (CN); QUALCOMM INCORPORATED, San Diego, CA (US)

(72) Inventors: Yu Zhang, Beijing (CN); Wanshi Chen, San Diego, CA (US); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 16/336,986

(22) PCT Filed: Sep. 30, 2016

(86) PCT No.: PCT/CN2016/101167
§ 371 (c)(1),
(2) Date: Mar. 27, 2019

(87) PCT Pub. No.: WO2018/058559
PCT Pub. Date: Apr. 5, 2018

(65) Prior Publication Data
US 2020/0052759 A1    Feb. 13, 2020

(51) Int. Cl.
*H04B 7/06* (2006.01)
*H04W 76/30* (2018.01)
*H04L 5/00* (2006.01)
*H04W 24/10* (2009.01)
*H04W 80/08* (2009.01)

(52) U.S. Cl.
CPC ......... *H04B 7/0626* (2013.01); *H04L 5/0051* (2013.01); *H04W 24/10* (2013.01); *H04W 76/30* (2018.02); *H04W 80/08* (2013.01)

(58) Field of Classification Search
None
See application file for complete search history.

(56) References Cited

U.S. PATENT DOCUMENTS

| | | | |
|---|---|---|---|
| 9,083,479 B2 * | 7/2015 | Etemad | H04W 36/00 |
| 2012/0106661 A1 | 5/2012 | Jiang et al. | |
| 2013/0021929 A1 * | 1/2013 | Kim | H04W 76/15 |
| | | | 370/252 |

(Continued)

FOREIGN PATENT DOCUMENTS

| | | |
|---|---|---|
| CN | 101917259 A | 12/2010 |
| CN | 102111246 A | 6/2011 |

(Continued)

OTHER PUBLICATIONS

International Search Report and Written Opinion for PCT/CN2016/101167, dated May 31, 2017.

(Continued)

*Primary Examiner* — Anh Ngoc M Nguyen
(74) *Attorney, Agent, or Firm* — Qualcomm Incorporated

(57) ABSTRACT

Certain aspects of the present disclosure provide techniques for dynamic switching of reference transmission schemes used by a UE for CSI measurement and reporting.

65 Claims, 14 Drawing Sheets

900

| TM | Primary transmission scheme | TM | Primary transmission scheme |
|---|---|---|---|
| 1 | Single-antenna port | 6 | Close-loop codebook-based precoding (1 layer) |
| 2 | Transmit diversity (SFBC or SFBC/FSTD) | 7 | Non-codebook-based precoding (1 layer) |
| 3 | Open-loop codebook based precoding | 8 | Non-codebook-based precoding (up to 2 layers) |
| 4 | Close-loop codebook based precoding | 9 | Non-codebook-based precoding (up to 8 layers) |
| 5 | MU-MIMO version of TM4 | 10 | Extension of TM9 for CoMP |

(56) References Cited

U.S. PATENT DOCUMENTS

| | | | |
|---|---|---|---|
| 2013/0286970 A1* | 10/2013 | Wang | H04L 5/0057 370/329 |
| 2013/0315337 A1 | 11/2013 | Dai et al. | |
| 2013/0343300 A1* | 12/2013 | Kim | H04B 7/0645 370/329 |
| 2015/0036610 A1 | 2/2015 | Kim et al. | |
| 2015/0043673 A1 | 2/2015 | Lee et al. | |
| 2015/0124663 A1* | 5/2015 | Chen | H04L 5/0073 370/278 |
| 2015/0195070 A1 | 7/2015 | Kim et al. | |
| 2016/0094280 A1* | 3/2016 | Zhu | H04B 7/0452 375/267 |
| 2016/0150509 A1 | 5/2016 | You et al. | |
| 2016/0164588 A1* | 6/2016 | Chen | H04B 7/0626 375/267 |
| 2016/0197687 A1* | 7/2016 | Song | H04W 72/0446 370/252 |
| 2016/0212733 A1* | 7/2016 | Davydov | H04L 5/0094 |
| 2016/0329945 A1* | 11/2016 | Onggosanusi | H04B 7/0632 |
| 2018/0212800 A1* | 7/2018 | Park | H04L 5/0057 |
| 2018/0309556 A1* | 10/2018 | Chen | H04W 72/042 |

FOREIGN PATENT DOCUMENTS

| | | |
|---|---|---|
| CN | 102546110 A | 7/2012 |
| CN | 104081813 A | 10/2014 |
| CN | 104285466 A | 1/2015 |
| CN | 104620516 A | 5/2015 |
| WO | WO-2013113273 A1 | 8/2013 |
| WO | 2013181825 A1 | 12/2013 |
| WO | WO-2018027804 A1 * | 2/2018 ........... H04B 7/0689 |

OTHER PUBLICATIONS

Supplementary European Search Report—EP16917309—Search Authority—The Hague—dated Mar. 31, 2020.

* cited by examiner

| TM | Primary transmission scheme | TM | Primary transmission scheme |
|---|---|---|---|
| 1 | Single-antenna port | 6 | Close-loop codebook-based precoding (1 layer) |
| 2 | Transmit diversity (SFBC or SFBC/FSTD) | 7 | Non-codebook-based precoding (1 layer) |
| 3 | Open-loop codebook based precoding | 8 | Non-codebook-based precoding (up to 2 layers) |
| 4 | Close-loop codebook based precoding | 9 | Non-codebook-based precoding (up to 8 layers) |
| 5 | MU-MIMO version of TM4 | 10 | Extension of TM9 for CoMP |

FIG. 9

CHANNEL STATE INFORMATION (CSI) ACQUISITION FOR DYNAMIC MIMO TRANSMISSION

BACKGROUND

Field of the Disclosure

Aspects of the present disclosure relate generally to wireless communications systems, and more particularly, to supporting dynamic changes to transmission schemes used for channel state information (CSI) measurements.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for supporting dynamic change to reference transmission schemes used by a user equipment (UE) for CSI measurement.

Certain aspects of the present disclosure provide a method for wireless communication that may be performed, for example, by a UE. The method generally includes determining a reference transmission scheme (TS) for channel state information (CSI) measurement based on signaling received from a base station (BS), performing CSI measurement based on the determination, and transmitting a CSI report based on the measurement.

Certain aspects of the present disclosure provide a method for wireless communication that may be performed, for example, by a base station (BS). The method generally includes providing signaling to a user equipment (UE) allowing the UE to determine a reference transmission scheme (TS) for channel state information (CSI) measurement and receiving a CSI report from the UE based on the measurement performed according to the reference TS.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9 illustrates example transmission schemes that may be used, by a UE, as reference transmission schemes for CSI measurement.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
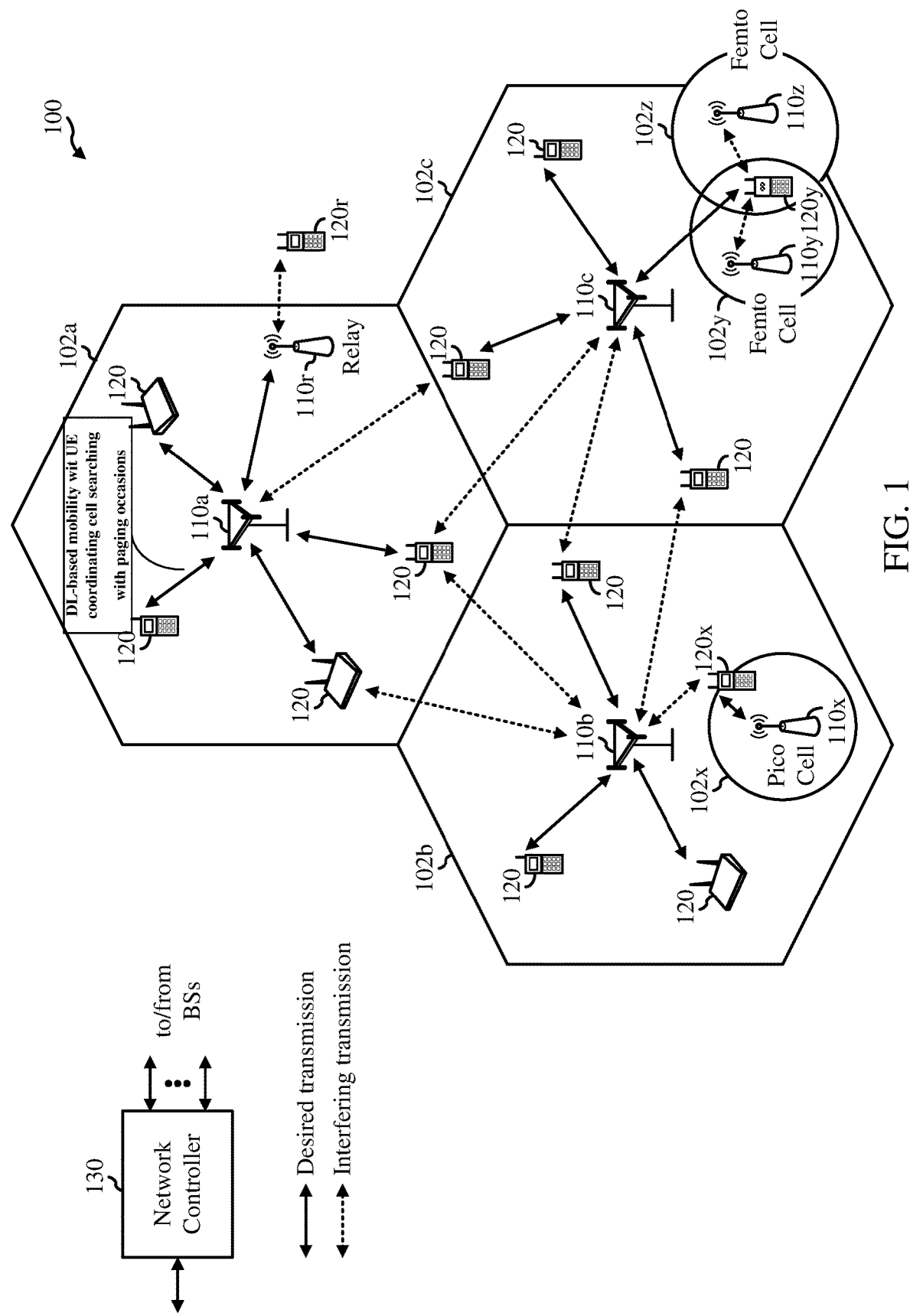
FIG. 1 is a block diagram conceptually illustrating an example telecommunications system, in accordance with certain aspects of the present disclosure.

Aspects of the present disclosure provide apparatus, methods, processing systems, and computer readable mediums for operations that may be performed in new radio (NR) applications (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC, (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide techniques and apparatus for supporting dynamic reference transmission scheme signaling for CSI measurement.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, TDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed.

For example, the wireless network may be a new radio (NR) or 5G network. According to aspects of the present disclosure, a UE 120 may perform certain actions to determine reference transmission schemes for CSI-measurements. According to aspects of the present disclosure, a UE 120 may perform certain actions to determine reference transmission schemes for CSI-measurements. Similarly, base stations 110 may provide signaling to the UE allowing such determination.

As will be described in more detail herein, a UE may be in a zone including a serving TRP and one or more non-serving TRPs. The serving and non-serving TRPs may be managed by the same ANC (see e.g., ANC 202 managing three TRPs 208 in FIG. 2).

UEs 120 may be configured to perform the operations 1100 and other methods described herein and discussed in more detail below which may help improve DL-based mobility. Base station (BS) 110 may comprise a transmission reception point (TRP), Node B (NB), 5G NB, access point (AP), new radio (NR) BS, etc.). The NR network 100 may include the central unit.

As illustrated in FIG. 1, the wireless network 100 may include a number of BSs 110 and other network entities. ABS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
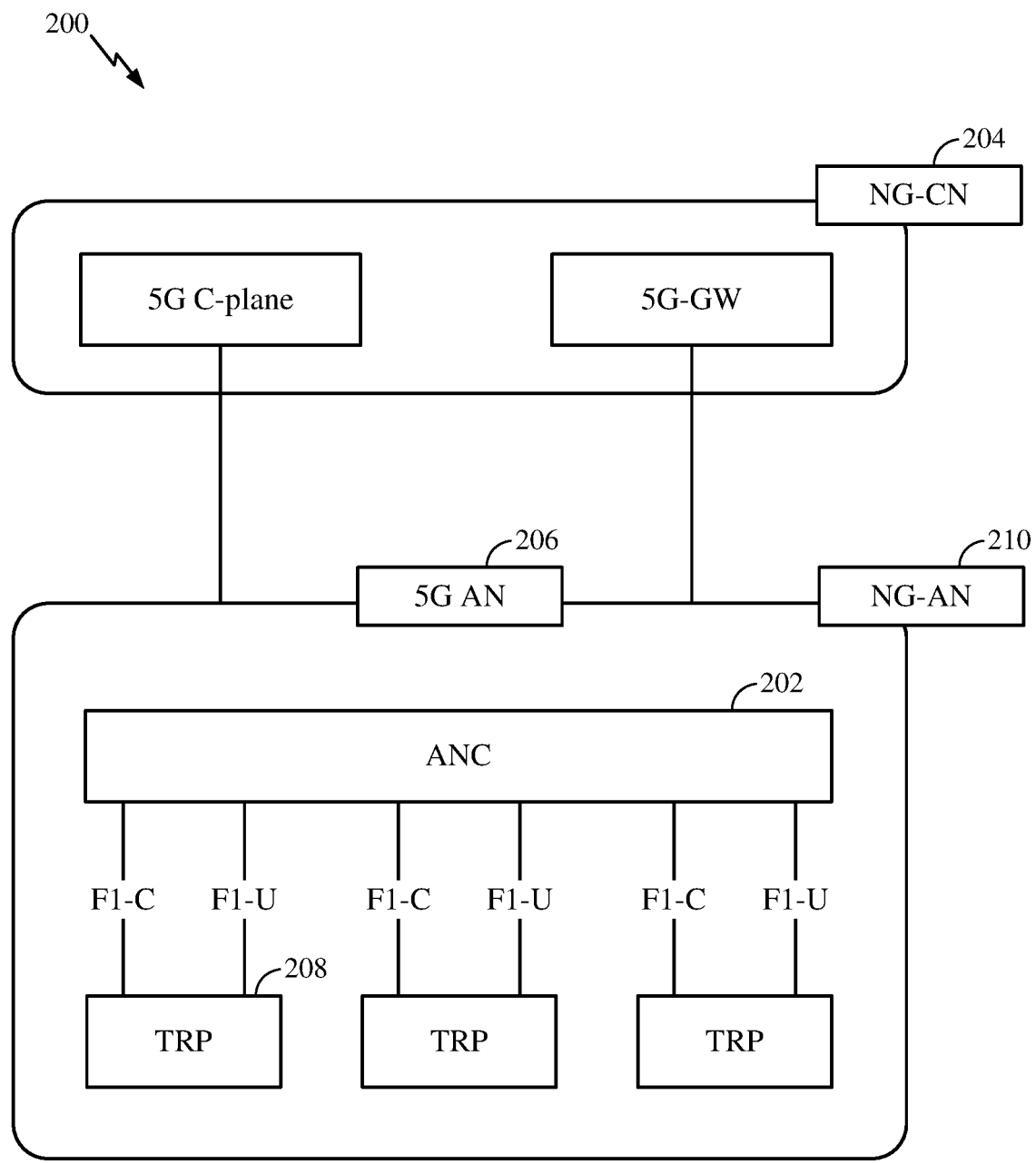
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Date Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPS 208).

Figure 3:
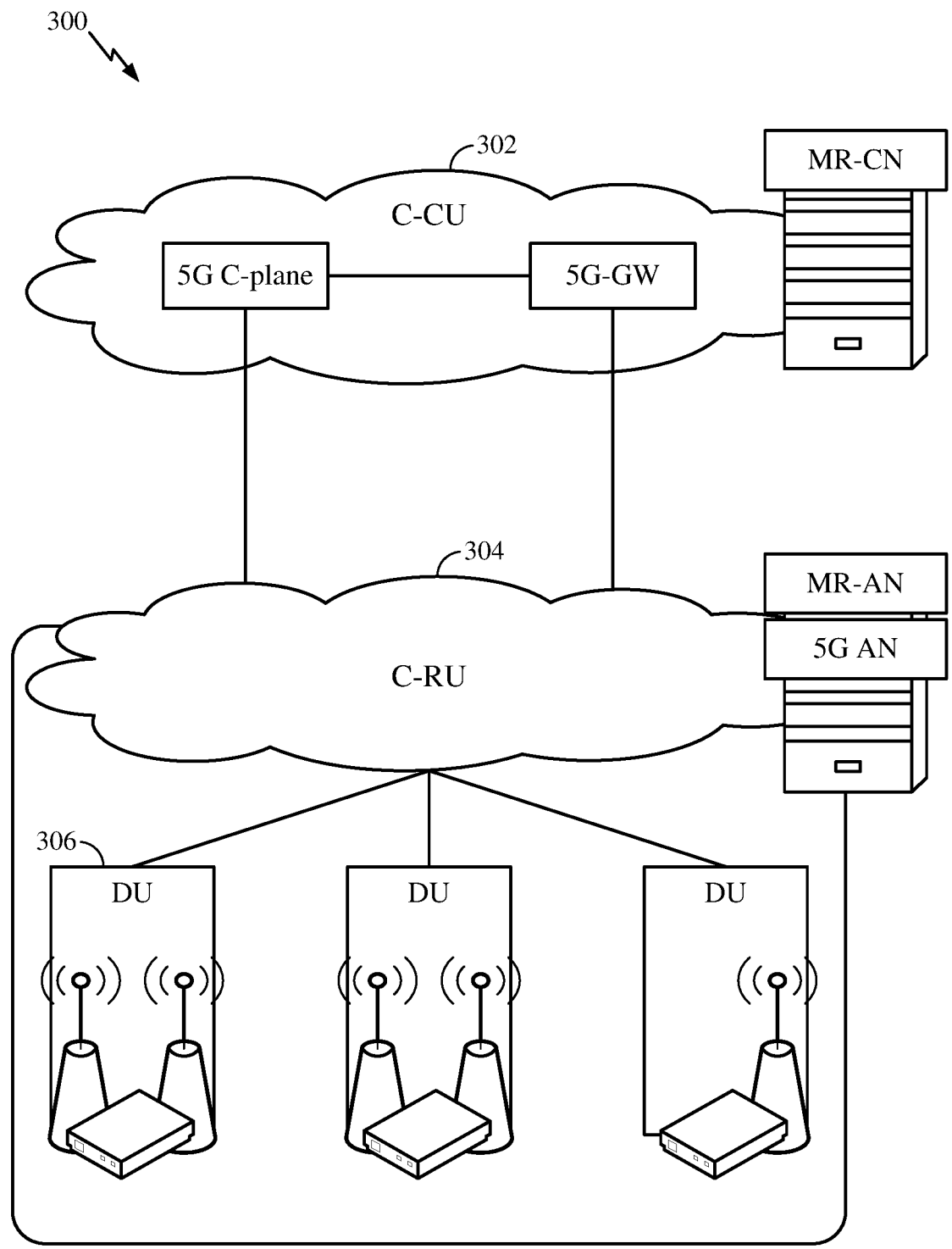
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
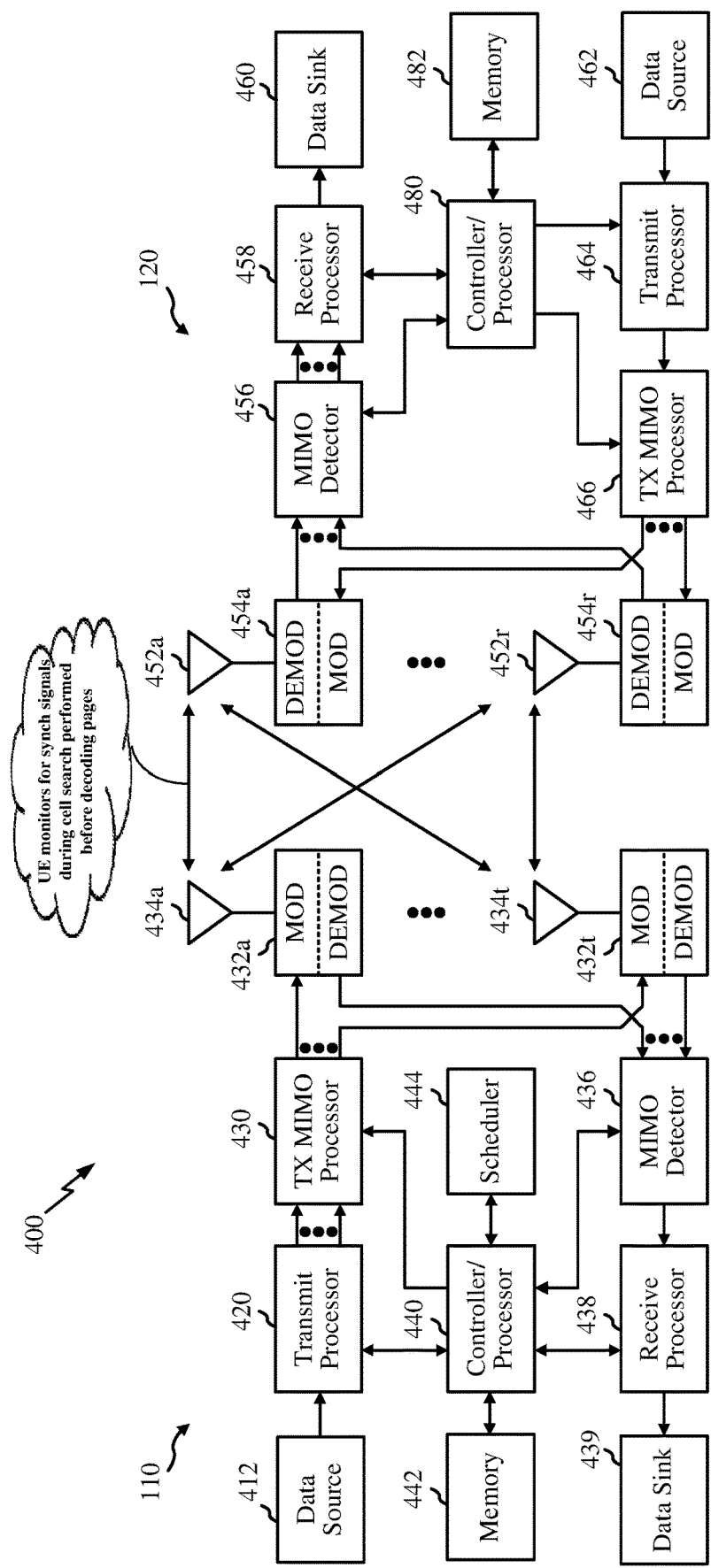
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. For example, UE 120 may be configured to coordinate waking up to perform cell searches with the occurrence of paging occasions (POs).

As described above, the BS may include a TRP. One or more components of the BS 110 and UE 120 play be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-12.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 4:20 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. Processes for the techniques described herein. The processor 480 and/or other processors and modules at the UE 120 may also perform or direct, e.g., the execution of the functional blocks illustrated in FIGS. 10 and 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
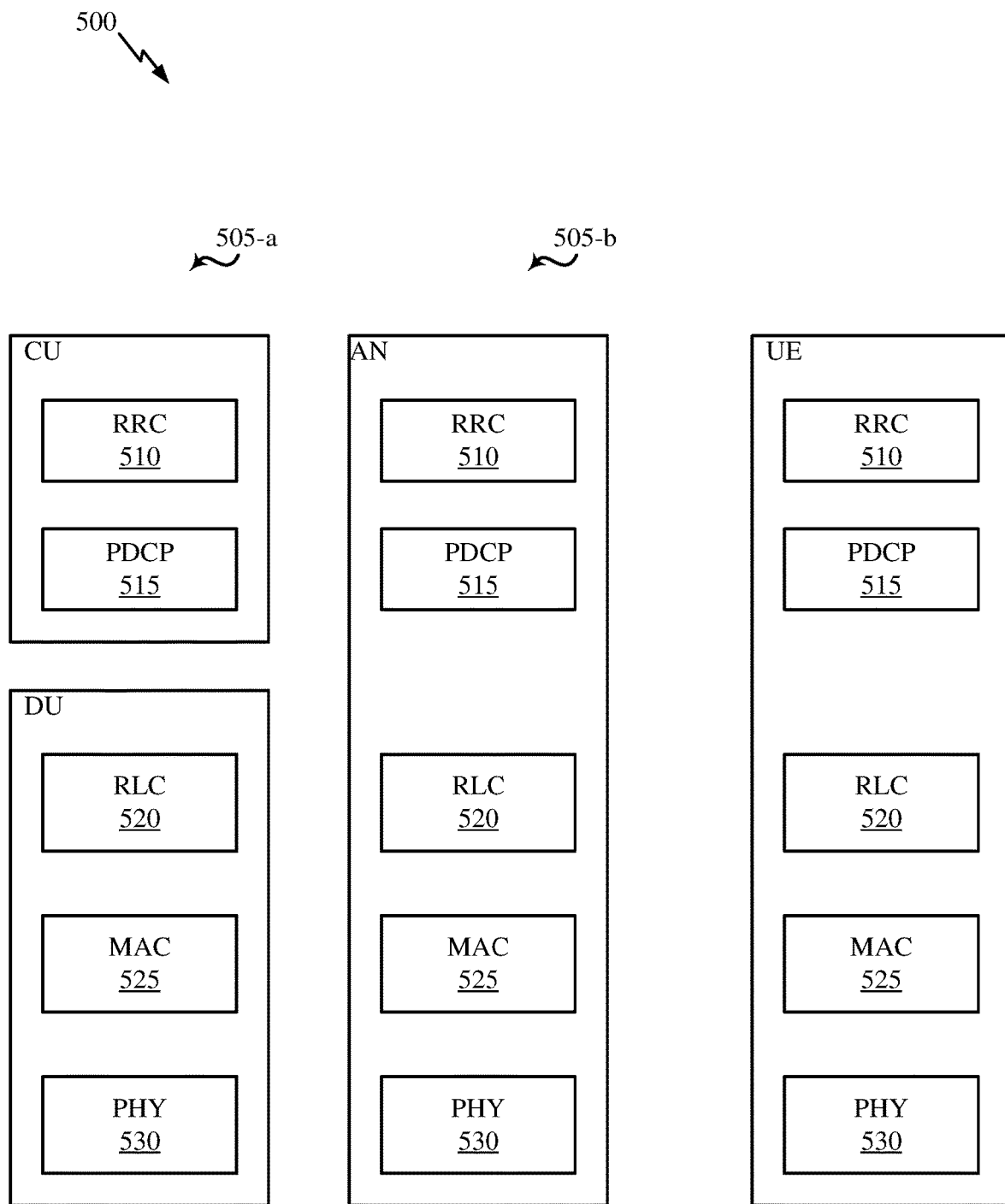
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
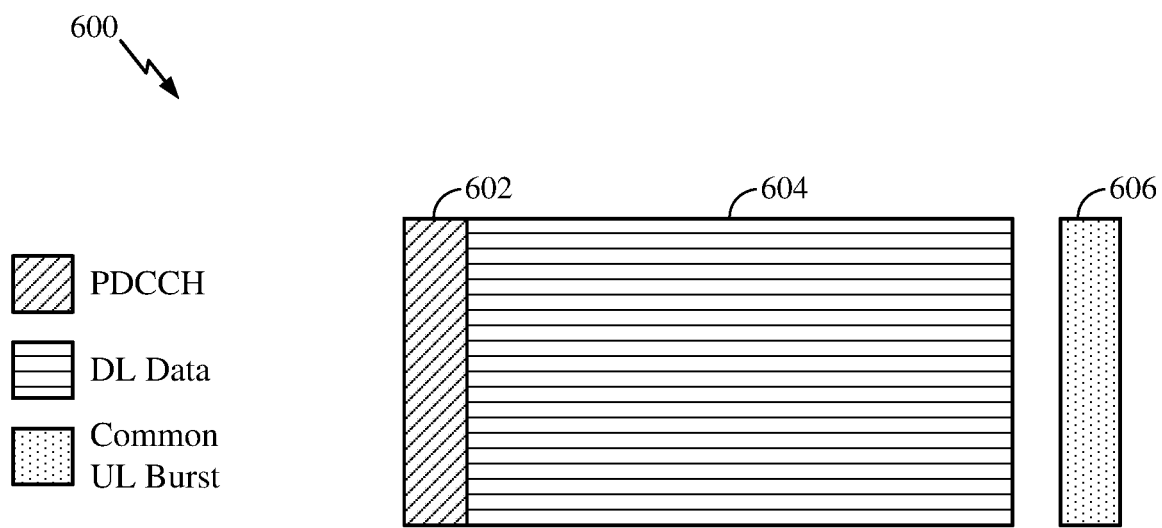
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
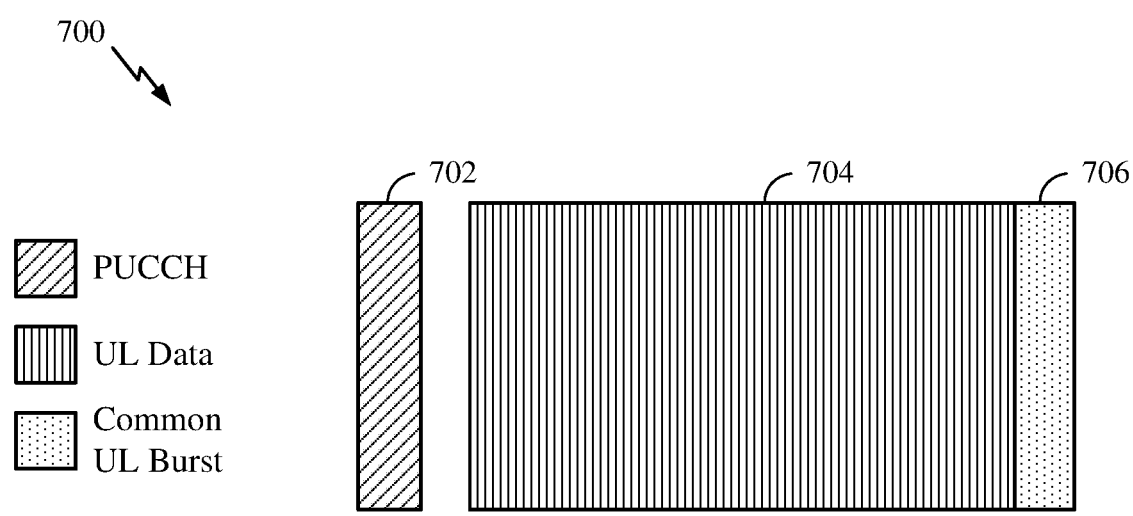
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to die communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
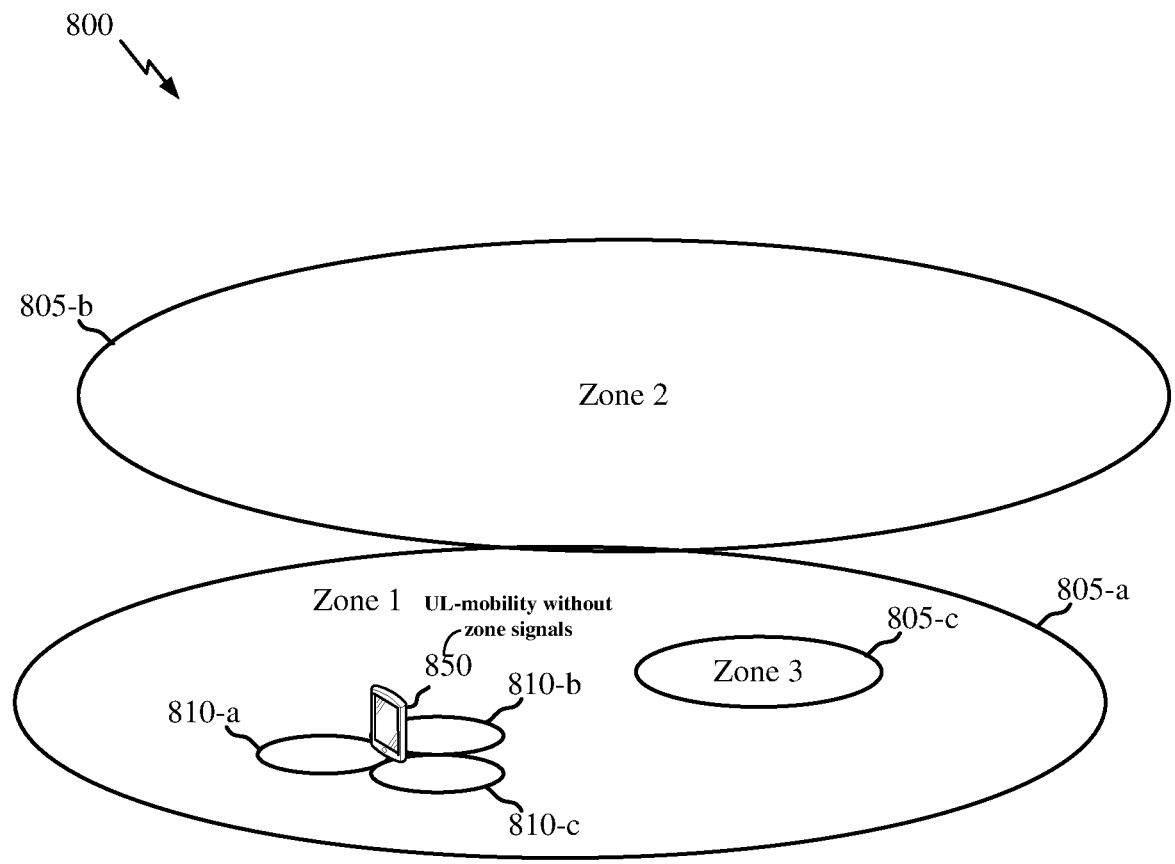
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-a (Zone 1), a second zone 805-b (Zone 2), and a third zone 805-c (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-a and the second zone 805-b) and overlapping zones (e.g., the first zone 805-a and the third zone 805-c). In some examples, the first zone 805-a and the second zone 805-b may each include one or more macro cells, micro cells, or pico cells, and the third zone 805-c may include one or more femto cells.

By way of example, the UE 850 is shown to be located in the first zone 805-a. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-a may monitor the common set of resources for a pilot signal from the UE 850. If the UE 850 is operating with a radio resource configuration associated with transmitting pilot signals using a dedicated set of resources, such as an RRC dedicated state, the UE 850 may transmit a pilot signal using a dedicated set of resources. Cells of a monitoring set of cells established for the UE 850 within the first zone 805-a (e.g., a first cell 810-a, a second cell 810-b, and a third cell 810-c) may monitor the dedicated set of resources for the pilot signal of the UE 850.

According to aspects of the present disclosure, the UE 850 performs one or more operations without relying on a zone signal. For example, the UE may perform an inter-zone handover using synchronization signals associated with a cell/TRP as opposed to a zone synchronization signal.

Example Channel State Information (CSI) Acquisition for Dynamic MIMO Transmission MIMO is seen as a key technology enabler for satisfying the NR coverage and capacity requirements, but not without tradeoffs. For example, the advantages of using MIMO come at the price of accurate channel state information (CSI) at the transmission/reception point (TRP).

In TDD systems, the CSI may be available at the TRP by exploiting the UL-DL channel reciprocity. In FDD systems, the CSI has to be obtained at the TRP via UE feedback based on DL channel estimation aided by DL reference signals (RS).

As shown in table 900 of FIG. 9, ten different DL transmission modes (TMs) are specified in LTE. The TMs differ in terms of how CSI is acquired by the terminal (UE) and fed back to the network. What reference TS is assumed for CSI measurement determines what reference signals are assumed for demodulation. Typically, the TM or transmission scheme (TS) (associated with a transmission mode) is configured via RRC signaling (semi-statically configured) and only limited switching may be supported. For TMs 3-10, dynamic switching (fallback) to transmit diversity (secondary TS) is possible via L1 signaling.

It is challenging to support dynamic switching between TSs. Conventionally, if a UE is configured with a particular TM, it may be dynamically switched between its primary TS and transmit diversity, but switching between other types of TSs is not currently supported.

This is unfortunate given that, for example, dynamic switching between close- and open-loop MIMO might yield sizeable gains if it was supported. Generally, a UE may assume a specific reference TS for CSI measurement, which may be bound to the configured TM. The eNB may be configured to override the reported CQI if the reference TS (used for measurement) is different from the actual PDSCH TS. For example, for TMs 3-6 and TMs 7-10 w/PMI/RI reporting, the primary TS is assumed for CSI measurement, the CQI is overridden if PDSCH TS is to fall back to transmit diversity. For TMs 7-10 w/o PMI/RI reporting, transmit diversity is assumed for CSI measurement, the CQI is overridden if the primary TS is used for PDSCH transmission.

Aspects of the present disclosure, allow for signaling, by a BS, that allows a UE to determine what reference TS to use for CSI measurement.

Figure 10:
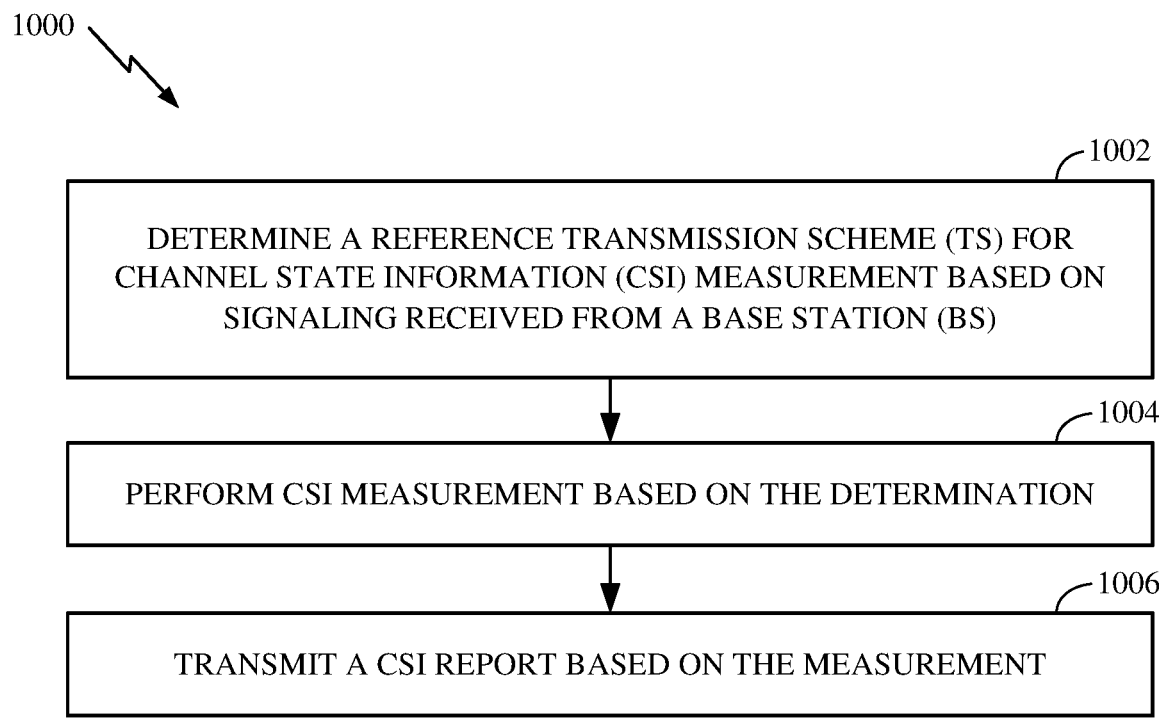
FIG. 10 illustrates example operations performed by a UE, in accordance with certain aspects of the present disclosure.

FIG. 10 illustrates example operations 1000 which may be performed by a UE, in accordance with aspects of the present disclosure. The UE may include one or more modules of UE 120 illustrated in FIG. 4.

At 1002, the UE determines a reference transmission scheme (TS) for channel state information (CSI) measurement based on signaling received from a base station (BS). At 1004, the UE performs CSI measurement based on the determination. At 1006, the UE transmits a CSI report based on the measurement. In one example, the signaling comprises an explicit indication of a reference transmission scheme via higher layer signaling. In another example, the signaling comprises art explicit indication of a reference transmission scheme via Layer 1 signaling. In yet another example, the signaling comprises an implicit indication of a reference transmission scheme.

Figure 11:
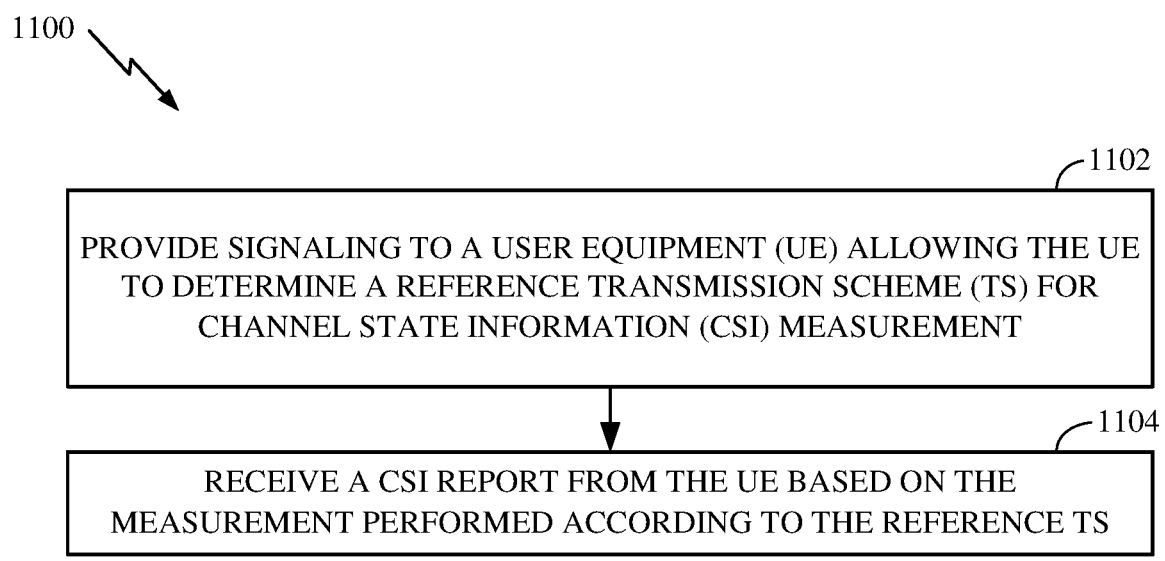
FIG. 11 illustrates example operations performed by a base station, in accordance with certain aspects of the present disclosure.

FIG. 11 illustrates example operations 1100 which may be performed by a BS, in accordance with aspects of the present disclosure. The operations 1100 may be considered complementary (BS-side) operations to the UE-side operations 1000 shown in FIG. 11. The BS may include one or more modules of BS 110 illustrated in FIG. 4.

At 1102, the BS provides signaling to a user equipment (UE) allowing the UE to determine a reference transmission scheme (TS) for channel state information (CSI) measurement. At 1104, the BS receives a CSI report from the UE based on the measurement performed according to the reference TS.

In some cases, such signaling could be provided via an explicit indication of reference transmission scheme via higher-layer signaling. In some cases, a TS may be associated w/CSI-RS resource configuration. For example, a UE may be configured with one or multiple CSI-RS resources and, for each CSI-RS resource, a reference transmission scheme may be configured.

In some cases, a reference transmission scheme may be implicitly dynamically switched, for example, via triggering A-CSI reporting or setup/release of semi-persistent CSI reporting.

In some cases, a reference TS may be associated with a CSI process configuration. In such cases, a UE may be configured with one or multiple CSI processes. For each CSI process, a reference transmission scheme may be configured. In some cases, a UE may be configured with one or multiple CSI reporting. For each CSI reporting, a reference transmission scheme may be configured.

Figure 12:
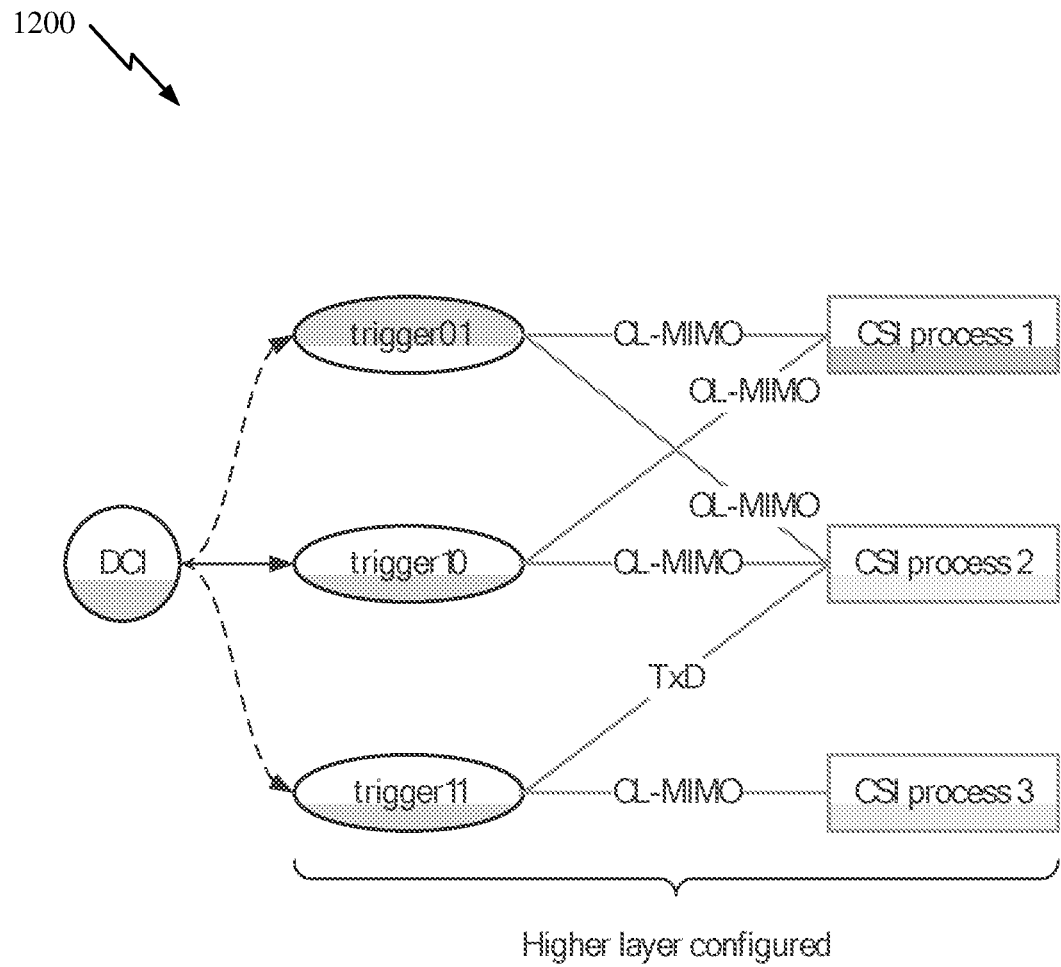
FIG. 12 illustrates an example indication of reference transmission schemes via higher-layer signaling, in accordance with certain aspects of the present disclosure.

In some cases, a UE may be configured with multiple CSI processes which belong to multiple A-CSI triggering sets. For each CSI process, a reference transmission scheme may be configured (e.g., via higher layer signaling) for each A-CSI triggering set. As illustrated in FIG. 12, when a UE is triggered to report CSI for a A-CSI triggering set (e.g., via Layer 1 signaling), it may assume the reference transmission scheme associated with the CSI process in the A-CSI triggering set. The example in FIG. 12 assumes three CSI processes, with different reference TSs assumed, depending on the corresponding trigger.

Figure 13:
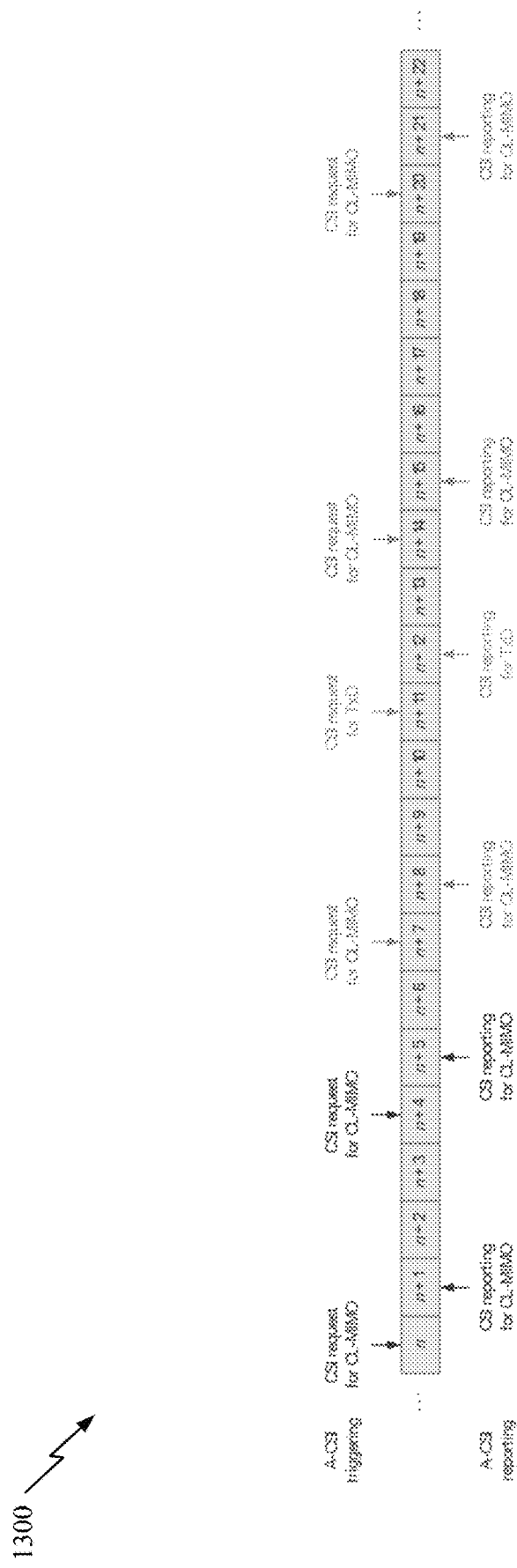
FIG. 13 illustrates an example indication of reference transmission schemes via lower-layer signaling, in accordance with certain aspects of the present disclosure.

As illustrated in FIG. 13, in some cases an indication of a reference TS may be part of the aperiodic CSI triggering (e.g., a CSI request). In this example, the triggered A-CSI reporting may assume the indicated reference transmission scheme (e.g., indicated in the request. In some cases, to reduce the DCI payload size, a UE may be configured with a subset of reference transmission schemes via higher-layer signaling and the lower layer (e.g., Layer 1) signaling may indicate one of the schemes in the configured subset.

Figure 14:
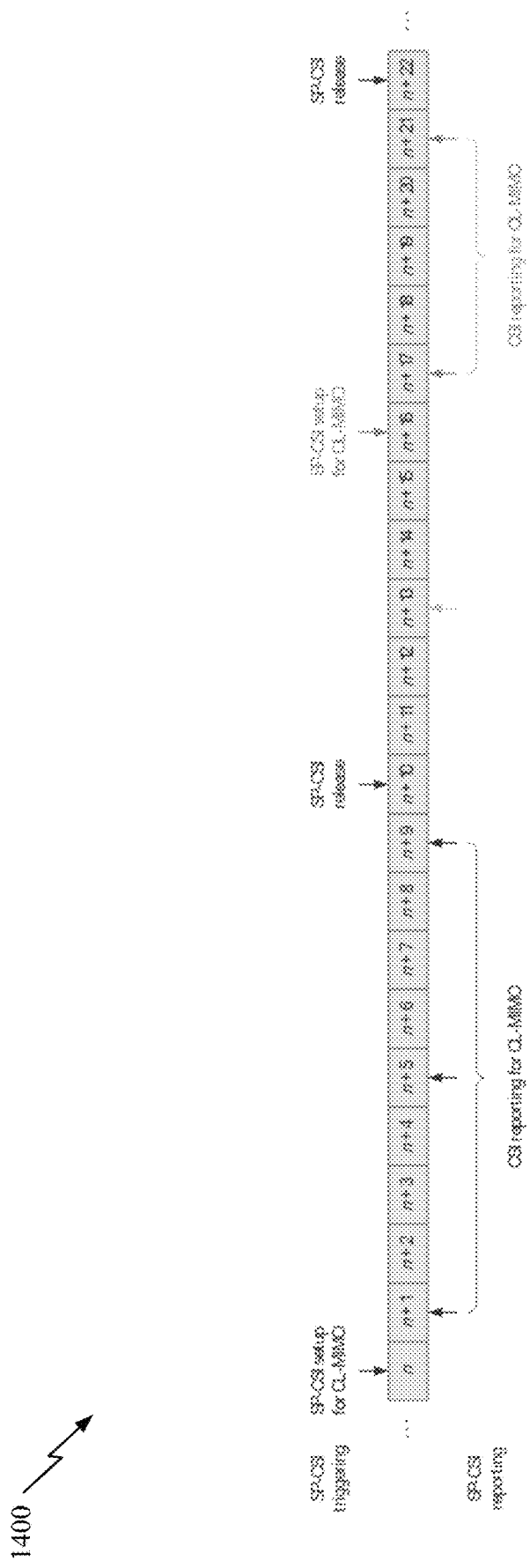
FIG. 14 illustrates an example indication of reference transmission schemes via semis-persistent scheduling, in accordance with certain aspects of the present disclosure.

As illustrated in FIG. 14, in some cases, an indication of a reference TS may be part of semi-persistent CSI triggering. For example, upon receiving some type of setup signaling, a UE may assume the transmission scheme as indicated until some type of release signaling is received. As in the case described above, to reduce the DCI payload size, a UE may be configured with a subset of reference transmission schemes via higher-layer signaling and the lower layer (e.g., Layer 1) signaling may indicate one of the schemes in the configured subset.

Figure 15:
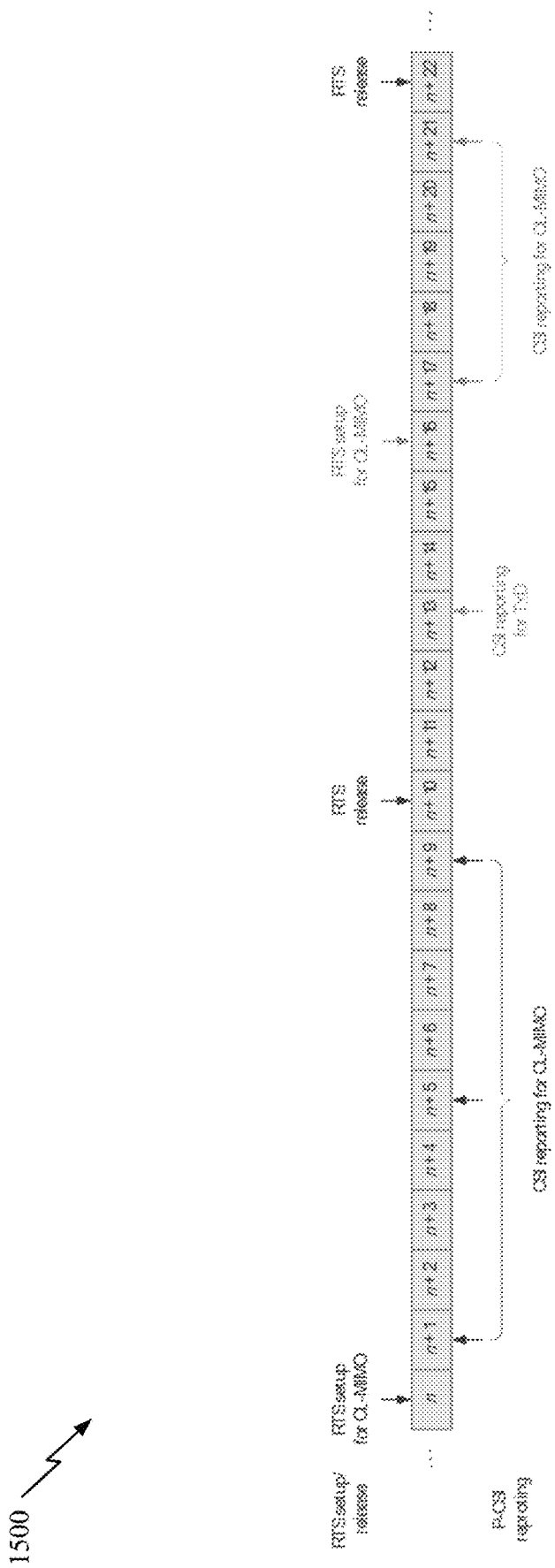
FIG. 15 illustrates another example indication of reference transmission schemes via lower-layer signaling, in accordance with certain aspects of the present disclosure.

FIG. 15 illustrates an example of using setup/release signaling of reference transmission scheme for Periodic-CSI. Upon receiving setup signaling, a UE may assume the transmission scheme as indicated (CL-MIMO in the illustrated example) until a release signaling is received. The UE may then assume a default transmission scheme (OL-MIMO in the illustrated example) when a reference transmission scheme is released. The default transmission scheme can be either predefined in the specification or configured via higher signaling. Again, to reduce the DCI payload size, a UE may be configured with a subset of reference transmission schemes via higher-layer signaling; the setup signaling may indicate a scheme in the configured subset.

In some cases, a UE may be configured by higher-layer with a subset of reference transmission schemes as cycling candidates (and the UE may cycle through the candidates). At each P-CSI reporting instance, the UE may report CSI assuming a different one of the candidate transmission schemes.

Figure 16:
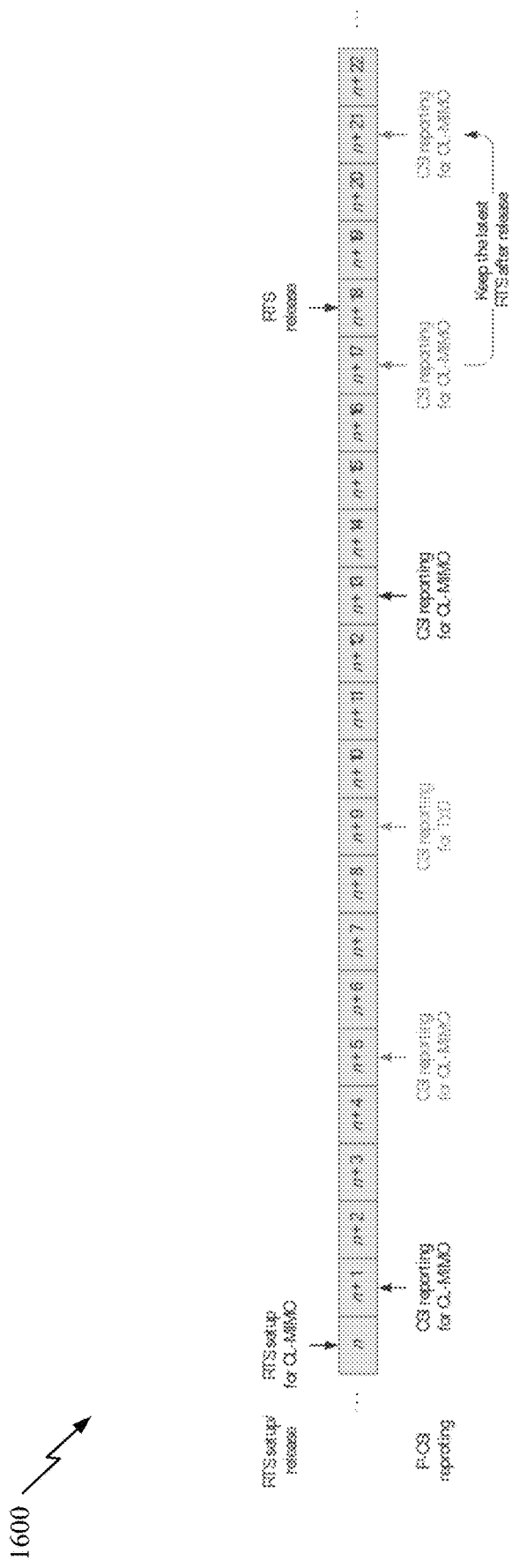
FIG. 16 illustrates an example indication of reference transmission schemes for periodic CSI (P-CSI) reporting, in accordance with certain aspects of the present disclosure.

As illustrated in FIG. 16, upon receiving a setup signaling, the UE may start cycling through the candidate reference transmission schemes. The first reference transmission scheme may be explicitly indicated (e.g., by the setup signaling) or may be implicitly indicated, for example, as the first (or last) one in the configured subset. In some cases, the starting reference TS may be derived based on the index of the DL subframe in which the setup signaling is received; or on the index of the UL subframe in which the CSI is reported.

When receiving release signaling, the UE may stop the reference transmission scheme cycling. For example, until receiving (subsequent) setup signaling, the UE may report CSI assuming the same transmission scheme as before receiving the release signaling or the UE may report CSI assuming the default transmission scheme which can be either predefined in the specification or configured by higher layer.

As noted above, implicit indication of reference transmission scheme may be dependent on a subframe index. For example, the reference transmission scheme may be implicitly indicated by the index of the (DL) subframe in which the A-CSI triggering or the semi-persistent CSI reporting setup signaling is received. In some cases, a UE may be configured with K reference transmission schemes $\{0, 1, \ldots, K-1\}$. If the UE receives a A-CSI triggering in subframe n, the UE may assume the kth reference transmission scheme for CSI measurement, where k=n mod K.

In some cases, the index of the (DL) subframe in which the RS for CSI measurement is transmitted may be used as an implicit indication. For example, a UE may be configured with K reference transmission schemes $\{0, 1, \ldots, K-1\}$. If the RS transmission happens in subframe n, the UE shall assume the kth reference transmission scheme for the CSI measurement based on that RS, where k=n mod K In some cases, the index of the (UL) subframe in which the CSI is reported may be used as an implicit indication. For example, a UE may be configured with K reference transmission schemes $\{0, 1, \ldots, K-1\}$. The UE shall assume the kth reference transmission scheme for the CSI reported in subframe n, where k=n mod K.

In addition to the indicated reference transmission scheme, the following parameters may also be indicated or associated with each reference transmission scheme: the number of REs assumed for CSI reporting, a type of control channel, and/or the ratio of PDSCH EPRE to CSI-RS EPRE. It may also be possible to provide CSI feedback in one report covering CSI information assuming two or more reference transmission schemes, for example, SU-MIMO vs. MUST.

Reference transmission schemes may also be dependent on periodic/aperiodic CSI reporting, for example, using different transmission schemes for P-CSI and A-CSI reporting. Instead of network configuring transmission scheme for CQI reporting, no matter Layer 1 or higher-layer signaling, it may also be possible for a UE to determine one transmission scheme and report it together with CSI. One example of this is that a UE may report either CL or OL CSI, according to the Doppler. In some cases a transmission scheme indicator (TSI), which may be similar to CRI) may be, for example, selected from a set of configured transmission schemes.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (AMC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining a reference transmission scheme (TS) for channel state information (CSI) measurement based on signaling received from a base station (BS);
   performing CSI measurement based on the determination; and
   transmitting a CSI report based on the measurement.

2. The method of claim 1, wherein the signaling comprises an explicit indication of a reference transmission scheme via higher layer signaling.

3. The method of claim 2, wherein:
   the signaling comprises a configuration of one or more CSI reference signals (CSI-RS) resources; and
   the determination is based on an association of a transmission scheme configured for each of the one or more CSI-RS resources.

4. The method of claim 2, wherein:
   the signaling comprises a configuration of one or more CSI processes; and
   the determination is based on an association of a transmission scheme configured for each of the one or more CSI-RS processes.

5. The method of claim 2, wherein:
   the signaling comprises a configuration of one or more CSI reporting schemes; and
   the determination is based on an association of a transmission scheme configured for each of the one or more CSI-RS reporting schemes.

6. The method of claim 2, wherein:
   the signaling comprises a configuration of one or more CSI processes belonging to multiple aperiodic CSI (A-CSI) triggering sets; and
   the determination is based on an association of a transmission scheme configured for each of the one or more A-CSI triggering sets.

7. The method of claim 6, wherein:
   when the UE is triggered to report CSI for an A-CSI triggering set, the UE assumes the reference transmission scheme associated with the CSI process in that A-CSI triggering set.

8. The method of claim 1, wherein the signaling comprises an explicit indication of a reference transmission scheme via Layer 1 signaling.

9. The method of claim 8, wherein:
   the UE is configured with a subset of reference transmission schemes; and
   the signaling indicates a transmission scheme in the configured subset.

10. The method of claim 9, wherein:
    the signaling indicates a reference transmission scheme the UE is to use for CSI measurement until receiving a release indication.

11. The method of claim 10, wherein release indication also indicates another transmission scheme in the configured subset to use for CSI measurement until receiving a setup indication.

12. The method of claim 10, wherein the UE assumes a default transmission scheme after receiving the release indication.

13. The method of claim 1, wherein:
    the UE is configured with a subset of reference transmission schemes; and
    the signaling indicates the UE is to cycle through the transmission schemes in the subset for different periodic CSI reporting instances.

14. The method of claim 13, wherein the UE is to begin cycling with a first transmission scheme in the subset determined based on at least one of: an indication provided in the signaling, a particular transmission scheme in the subset, or derived based on an index for a subframe in which the signaling is received.

15. The method of claim 13, wherein the UE is configured to, after receiving the release signaling, use at least one of a default transmission scheme or same transmission scheme as before receiving the release signaling.

16. The method of claim 1, wherein the signaling comprises an implicit indication of a reference transmission scheme.

17. The method of claim 16, wherein the signaling comprises a subframe index.

18. The method of claim 17, wherein the subframe index comprises: a subframe index for a subframe in which aperiodic channel state information (A-CSI) triggering or semi-persistent CSI reporting setup signaling is received.

19. The method of claim 17, wherein the subframe index comprises: a subframe index for a subframe in which the CSI-RS for CSI measurement is transmitted.

20. The method of claim 17, wherein the subframe index comprises: a subframe index for a subframe in which the CSI report is transmitted.

21. The method of claim 16, wherein the signaling comprises signaling for a type of control channel.

22. The method of claim 1, wherein the signaling comprises a configuration of a number of resource elements (REs) for each transmission scheme assumed for reporting.

23. The method of claim 1, wherein the signaling comprises a configuration of a ratio of physical downlink shared channel (PDSCH) energy per resource element (EPRE) to CSI reference signal (CSI-RS) EPRE for each reference transmission scheme assumed for reporting.

24. The method of claim 1, wherein the UE uses different transmission schemes for aperiodic CSI reporting than for periodic CSI reporting.

25. The method of claim 1, wherein the UE provides to the BS an indication of the reference transmission scheme which is assumed for the CSI reporting.

26. A method for wireless communications by a base station (BS), comprising:
providing signaling to a user equipment (UE) allowing the UE to determine a reference transmission scheme (TS) for channel state information (CSI) measurement; and
receiving a CSI report from the UE based on the measurement performed according to the reference TS.

27. The method of claim 26, wherein the signaling comprises an explicit indication of a reference transmission scheme via higher layer signaling.

28. The method of claim 27, wherein:
the signaling comprises a configuration of one or more CSI reference signals (CSI-RS) resources; and
each of the one or more CSI-RS resources has an associated reference TS.

29. The method of claim 27, wherein:
the signaling comprises a configuration of one or more CSI processes; and
each of the one or more CSI-RS processes has an associated reference TS.

30. The method of claim 27, wherein:
the signaling comprises a configuration of one or more CSI reporting schemes; and
each of the one or more CSI-RS reporting schemes has an associated reference TS.

31. The method of claim 27, wherein:
the signaling comprises a configuration of one or more CSI processes belonging to multiple aperiodic CSI (A-CSI) triggering sets; and each of the one or more A-CSI triggering sets has an associated reference TS.

32. The method of claim 31, wherein:
when the UE is triggered to report CSI for an A-CSI triggering set, the BS assumes the UE used the reference transmission scheme associated with the CSI process in that A-CSI triggering set.

33. The method of claim 32, wherein the signaling comprises an explicit indication of a reference transmission scheme via Layer 1 signaling.

34. The method of claim 33, wherein:
the UE is configured with a subset of reference transmission schemes; and
the signaling indicates a transmission scheme in the configured subset.

35. The method of claim 33, wherein:
the signaling indicates a reference transmission scheme the UE is to use for CSI measurement until the BS sends the UE a release indication.

36. The method of claim 35, wherein release indication also indicates another transmission scheme in the configured subset to use for CSI measurement until the BS transmits the UE a setup indication.

37. The method of claim 35, wherein the BS assumes the UE uses a default transmission scheme after receiving the release indication.

38. The method of claim 26, wherein:
the UE is configured with a subset of reference transmission schemes; and
the signaling indicates the UE is to cycle through the transmission schemes in the subset for different periodic CSI reporting instances.

39. The method of claim 38, wherein the UE is to begin cycling with a first transmission scheme in the subset determined based on at least one of: an indication provided in the signaling, a particular transmission scheme in the subset, or derived based on an index for a subframe in which the signaling is received.

40. The method of claim 38, wherein the BS is configured to assume, after transmitting the release signaling, that the UE uses at least one of a default transmission scheme or same transmission scheme as before the BS transmitted the release signaling.

41. The method of claim 26, wherein the signaling comprises an implicit indication of a reference transmission scheme.

42. The method of claim 41, wherein the signaling comprises a subframe index.

43. The method of claim 42, wherein the subframe index comprises: a subframe index for a subframe in which aperiodic channel state information (A-CSI) triggering or semi-persistent CSI reporting setup signaling is received.

44. The method of claim 42, wherein the subframe index comprises: a subframe index for a subframe in which the CSI-RS for CSI measurement is transmitted.

45. The method of claim 42, wherein the subframe index comprises: a subframe index for a subframe in which the CSI report is transmitted.

46. The method of claim 41, wherein the signaling comprises signaling for a type of control channel.

47. The method of claim 26, wherein the signaling comprises a configuration of a number of resource elements (REs) for each transmission scheme assumed for reporting.

48. The method of claim 26, wherein the signaling comprises a configuration of a ratio of physical downlink shared channel (PDSCH) energy per resource element (EPRE) to CSI reference signal (CSI-RS) EPRE for each reference transmission scheme assumed for reporting.

49. The method of claim 26, wherein the BS configures the UE to use different transmission schemes for aperiodic CSI reporting than for periodic CSI reporting.

50. The method of claim 26, further comprising receiving, from the UE, an indication of the reference transmission scheme which is assumed for the CSI reporting.

51. An apparatus for wireless communications by a user equipment (UE), comprising:
a memory having executable instructions stored thereon; and
a processor configured to execute the executable instructions in order to cause the apparatus to:
determine a reference transmission scheme (TS) for channel state information (CSI) measurement based on signaling received from a base station (BS);
perform CSI measurement based on the determination; and
transmit a CSI report based on the measurement.

52. The apparatus of claim 51, wherein the signaling comprises an explicit indication of the reference transmission scheme via higher layer signaling.

53. The apparatus of claim 52, wherein:
the signaling comprises a configuration of one or more CSI reference signals (CSI-RS) resources; and
the processor is configured to determine the reference TS based on an association of a transmission scheme configured for each of the one or more CSI-RS resources.

54. The apparatus of claim 52, wherein:
the signaling comprises a configuration of one or more CSI processes; and
the processor is configured to determine the reference TS based on an association of a transmission scheme configured for each of the one or more CSI-RS processes.

55. The apparatus of claim 52, wherein:
the signaling comprises a configuration of one or more CSI reporting schemes; and
the processor is configured to determine the reference TS based on an association of a transmission scheme configured for each of the one or more CSI-RS reporting schemes.

56. The apparatus of claim 52, wherein:
the signaling comprises a configuration of one or more CSI processes belonging to multiple aperiodic CSI (A-CSI) triggering sets; and
the processor is configured to determine the reference TS based on an association of a transmission scheme configured for each of the one or more A-CSI triggering sets.

57. The apparatus of claim 51, wherein the signaling comprises an explicit indication of the reference TS via Layer 1 signaling.

58. The apparatus of claim 57, wherein:
the UE is configured with a subset of reference transmission schemes; and
the signaling indicates a transmission scheme in the configured subset.

59. The apparatus of claim 51, wherein:
the UE is configured with a subset of reference transmission schemes; and
the signaling indicates the UE is to cycle through the transmission schemes in the subset for different periodic CSI reporting instances.

60. The apparatus of claim 51, wherein the signaling comprises an implicit indication of a reference transmission scheme.

61. The apparatus of claim 51, wherein the signaling comprises a configuration of a number of resource elements (REs) for each transmission scheme assumed for reporting.

62. The apparatus of claim 51, wherein the signaling comprises a configuration of a ratio of physical downlink shared channel (PDSCH) energy per resource element (EPRE) to CSI reference signal (CSI-RS) EPRE for each reference transmission scheme assumed for reporting.

63. The apparatus of claim 51, wherein the UE uses different transmission schemes for aperiodic CSI reporting than for periodic CSI reporting.

64. The apparatus of claim 51, wherein the processor is further configured to cause the apparatus to provide, to the BS, an indication of the reference transmission scheme which is assumed for the CSI reporting.

65. An apparatus for wireless communications by a base station (BS), comprising:
a memory having executable instructions stored thereon; and
a processor configured to execute the executable instructions to cause the apparatus to:
provide signaling to a user equipment (UE) allowing the UE to determine a reference transmission scheme (TS) for channel state information (CSI) measurement; and
receive a CSI report from the UE based on the measurement performed according to the reference TS.

* * * * *